(12) United States Patent
Sato et al.

(10) Patent No.: US 8,815,043 B2
(45) Date of Patent: Aug. 26, 2014

(54) DRY LAMINATION METHOD AND LAMINATE OBTAINED BY USING THE SAME

(75) Inventors: Yoshihiro Sato, Tokyo (JP); Masato Ohashi, Tokyo (JP); Yasuki Nakajima, Tokyo (JP)

(73) Assignee: Toyo-Morton, Ltd., Tokyo (JP)

( * ) Notice: Subject to any disclaimer, the term of this patent is extended or adjusted under 35 U.S.C. 154(b) by 0 days.

(21) Appl. No.: 12/819,523

(22) Filed: Jun. 21, 2010

(65) Prior Publication Data

US 2011/0293956 A1    Dec. 1, 2011

Related U.S. Application Data

(63) Continuation of application No. PCT/JP2010/058969, filed on May 27, 2010.

(51) Int. Cl.
*B29C 65/52* (2006.01)
*B32B 37/12* (2006.01)
*B32B 38/14* (2006.01)
*B32B 43/00* (2006.01)
*C08J 5/12* (2006.01)
*B05D 5/10* (2006.01)

(52) U.S. Cl.
USPC ............ 156/277; 156/307.1; 156/307.3; 427/207.1; 427/428.06

(58) Field of Classification Search
USPC .......... 156/277, 307.1, 307.3, 384, 387; 427/207.1, 257, 428.01, 428.06
See application file for complete search history.

(56) References Cited

U.S. PATENT DOCUMENTS

| 5,900,109 A | * | 5/1999 | Sanders et al. | 156/552 |
| 7,179,518 B2 | * | 2/2007 | Masuda | 428/204 |
| 2009/0239069 A1 | | 9/2009 | Yonehama et al. | |

FOREIGN PATENT DOCUMENTS

| EP | 1 186 638 A1 | 3/2002 |
| JP | 61-167 | 1/1986 |
| JP | 4-328187 | 11/1992 |
| JP | 9-131959 | 5/1997 |
| JP | 10-88089 | 4/1998 |
| JP | 10-181179 | 7/1998 |
| JP | 11-342150 | 12/1999 |
| JP | 2001-328215 | 11/2001 |

(Continued)

OTHER PUBLICATIONS

Machine English translation of JP10-88089 (Apr. 2, 2012).*

(Continued)

*Primary Examiner* — Sing P Chan
(74) *Attorney, Agent, or Firm* — Oblon, Spivak, McClelland, Maier & Neustadt, L.L.P.

(57) ABSTRACT

Provided is a dry lamination method, and a laminate having superior appearance obtained by the method. The method in which an adhesive having a solid matter content of 35 wt % or more diluted in a solvent is applied onto a film according to a gravure process, the solvent is volatilized, and the resulting film is adhered with another film to obtain a laminate, wherein the adhesive is applied by: a gravure cylinder in which the screen number of gravure cylinder is 135 to 270 lines/inch and cell volume is 10 to 30 cc/m²; a gravure cylinder which is engraved by an electronic engraving machine to have a stylus angle of 120 to 140° and the screen number of gravure cylinder of 120 to 270 lines/inch; or a ceramic roll in which the screen number of gravure cylinder is 135 to 350 lines/inch and cell volume is 10 to 30 cc/m².

10 Claims, 3 Drawing Sheets

(56) References Cited

FOREIGN PATENT DOCUMENTS

| | | |
|---|---|---|
| JP | 2002-114934 | 4/2002 |
| JP | 2002-192896 | 7/2002 |
| JP | 2003-211814 | 7/2003 |
| JP | 2005-74939 | 3/2005 |
| JP | 2005-298588 | 10/2005 |
| JP | 2006-111649 | 4/2006 |
| JP | 2006-137044 | 6/2006 |
| JP | 2006-159855 | 6/2006 |
| JP | 2006-205431 | 8/2006 |
| JP | 2006-224614 | 8/2006 |
| JP | 2006-284681 | 10/2006 |
| JP | 2007-1084 | 1/2007 |
| JP | 2007-38630 | 2/2007 |
| JP | 2007-136732 | 6/2007 |
| JP | 2007-160700 | 6/2007 |
| JP | 2008-18680 | 1/2008 |
| JP | 2010-143178 | 7/2010 |
| JP | 2010-155343 | 7/2010 |
| TW | 200840708 A | 10/2008 |
| TW | 200911947 A | 3/2009 |

OTHER PUBLICATIONS

Machine English Translation JP 2007-001084.*

Japanese Office Action issued Jul. 12, 2011, in Patent Application No. 2008-325327 (with English-language translation).

International Search Report and Written Opinion issued May 27, 2010 in PCT/JP2010/058969 (with English Translation of Category of Cited Documents).

Office Action issued Feb. 8, 2011, in Japanese Patent Application No. 2008-325327 (with English-language Translation).

Office Action issued Mar. 22, 2011, in Japanese Patent Application No. 2008-333277 (with English-language Translation).

Office Action issued on Apr. 12, 2012 in the Korean counterpart application No. 10-2010-7013721 (with English Translation).

Korean Office Action issued Nov. 13, 2012 in Patent Application No. 10-2010-7013721 with English Translation.

English Translation of the International Preliminary Report on Patentability and Written Opinion issued Dec. 4, 2012 in PCT/JP2010/058969.

Combined Taiwanese Office Action and Search Report Issued Sep. 20, 2012 in Patent Application No. 099118319 (with English translation).

Chinese Office Action dated Mar. 5, 2013 in corresponding Chinese Office Action No. 201080000911.4 with English Translation.

Combined Chinese Office Action and Search Report issued Jan. 21, 2014 in Patent Application No. 201080000911.4 (with English language translation).

* cited by examiner

DRY LAMINATION METHOD AND LAMINATE OBTAINED BY USING THE SAME

TECHNICAL FIELD

The present invention relates to a dry lamination method and a laminate obtained by using the method.

BACKGROUND ART

As for a method of adhering various plastic films to each other, a method of adhering a plastic film to a plastic film on which a metal is deposited, or a method of adhering a plastic film to a thin metal film, a dry lamination method has been conventionally employed. According to the dry lamination method, an adhesive diluted in a solvent such as an organic solvent or water, etc. is applied to a substrate, the solvent is volatilized using a dryer, and the resulting substrate is adhered to another substrate while applying heat and pressure thereto.

As for the adhesives that are used for the dry lamination method, organic solvent-based two-component curing type adhesives are widely used. For example, a first component contains a solution in which a resin comprises a hydroxy group such as polyester resin or polyurethane resin, etc. and a second component contains a polyisocyanate compound.

The organic solvent-based adhesives described above contain a great amount of an organic solvent. As such, a dry lamination method using the adhesives has various problems such as environmental contamination due to exhaust gas, risk of fire explosion, and sanitary problems in working places, etc. Since the conventional organic solvent-based adhesive contains a solid matter, the content of which is 30% by weight or less, a great amount of organic solvent is released to the outside atmosphere when the organic solvent is volatilized after application of the adhesive. As such, high-solid type adhesives having a high solid content in which the amount of an organic solvent is reduced have been suggested (See, Patent Document No. 1).

However, when such high-solid type adhesives are used for a dry lamination method which is based on a conventional gravure process, a stripe pattern is formed in the direction of coating flow on the surface of a laminate after lamination. For such a reason, there has been a problem in that uniform appearance is not obtained and good finishing results are not easily obtained. In addition, so-called tunneling phenomenon sometimes occurs by which a laminate obtained after lamination is peeled off in a tunnel shape.

Recently, in view of demands to improve condition for working environment, to strengthen fire regulations and to restrict release of VOC (volatile organic compound) to atmosphere etc., nonorganic solvent-based adhesives are strongly required. As such, a dry lamination method using water-based adhesives in which the adhesives are solubilized in water has been suggested. According to the dry lamination method using water-based adhesives, working environment can be improved and problems associated with fire control and release of VOC to atmospheric air, etc. can be solved. However, a new problem which is derived from its intrinsic aqueous characteristic arises. Specifically, due to poor wetting into a plastic substrate which is attributing to high surface tension of water, a stripe pattern is formed on the surface of a laminate obtained after lamination, and therefore there is a problem in that good appearance cannot be obtained.

PRIOR ART LITERATURES

Patent Document

Patent Document No. 1: Japanese Patent Application Laid-Open (JP-A) No. 2005-298588

DISCLOSURE OF THE INVENTION

Problems to be Solved by the Invention

An object of the present invention is to provide a dry lamination method in which a laminate obtained after Lamination has good appearance and causes no tunneling phenomenon therein, and a laminate that is obtained by using the method.

Means for Solving the Problems

As a result of extensive studies to solve the problems described above, inventors of the present invention found that, when applying adhesives having a solid matter content of 35% by weight or above according to gravure process, by selecting the screen number of gravure cylinder and cell volume in a gravure cylinder having a chrome plated iron rod (hereinbelow, referred to as 'gravure cylinder'), selecting stylus angle and the screen number of gravure cylinder which is engraved with an electronic engraving machine, or selecting the screen number of gravure cylinder and cell volume of a ceramic roll having a ceramic-coated iron rod (hereinbelow, referred to as 'ceramic roll'), a laminate obtained after lamination has good appearance regardless of the use of organic solvent-based adhesives or water-based adhesives, and therefore completed the present invention.

One embodiment of the present invention relates to a dry lamination method in which adhesives having a solid matter content of 35% by weight or above diluted in a solvent are coated on a film according to a gravure process, the solvent is volatilized, and the resulting film is adhered with another film to obtain a laminate, which is characterized in that the adhesives are applied by using the following:

a gravure cylinder in which the screen number of gravure cylinder is 135 to 270 lines/inch and cell volume is 10 to 30 cc/m$^2$, a gravure cylinder which is engraved by an electronic engraving machine to have a stylus angle of 120 to 140° and the screen number of gravure cylinder of 120 to 270 lines/inch, or a ceramic roll in which the screen number of gravure cylinder is 135 to 350 lines/inch and cell volume is 10 to 30 cc/m$^2$.

The above-described adhesives are either organic solvent-based adhesives or water-based adhesives.

Furthermore, another embodiment of the present invention relates to a laminate which is obtained by using the dry lamination method described above.

Subject of the present invention is related to Japanese Patent Application Nos. 2008-325327 (filed on Dec. 22, 2008) and 2008-333277 (filed on Dec. 26, 2008), and contents of these applications are entirely incorporated herein by reference.

Effects of the Invention

According to one embodiment of the present invention, is possible to provide a dry lamination method by which a laminate obtained after lamination has appearance having no stripe pattern or orange peel-like pattern and has a uniformly finished surface with no scratches and which does not cause a tunneling phenomenon to occur, and a laminate obtained according to the method.

BEST MODE FOR CARRYING OUT THE INVENTION

With respect to the dry lamination method of the present invention in which adhesives having a solid matter content of 35% by weight or above diluted in a solvent are coated on a film according to a gravure process, the solvent is volatilized, and the resulting film is adhered with another film, the adhesives are applied by using any one of (i) to (iii) as follows:

(i) a gravure cylinder in the screen number of gravure cylinder is 135 to 270 lines/inch and a cell volume is 10 to 30 cc/m$^2$ (hereinbelow, referred to as "gravure cylinder (I)"), (ii) a gravure cylinder which is engraved by an electronic engraving machine to have a stylus angle of 120 to 140° and the screen number of gravure cylinder of 120 to 270 lines/inch (hereinbelow, referred to as "gravure cylinder (II)"), and (iii) a ceramic roll in which the screen number of gravure cylinder is 135 to 350 lines/inch and a cell volume is 10 to 30 cc/m$^2$.

(Gravure Cylinder (I))

First, a gravure cylinder in which the screen number of gravure cylinder is 135 to 270 lines/inch and a cell volume is 10 to 30 cc/m$^2$ will be explained.

In gravure cylinder (I), the screen number of gravure cylinder is 135 to 270 lines/inch, and preferably 135 to 255 lines/inch.

When adhesives having a solid matter content of 35% by weight or above is coated using a gravure cylinder in which the screen number of gravure cylinder is the same or greater than 135 lines/inch, a stripe pattern in the direction of coating flow does not occur, thus the laminate obtained after lamination is favorable in terms of appearance quality.

Meanwhile, a gravure cylinder having the screen number of gravure cylinder of 270 lines/inch or less can be prepared to have a cell volume of 10 cc/m$^2$ or more, and therefore a sufficient amount of coating is ensured. As a result, good adhesive property and favorable appearance quality can be obtained.

Cell volume of the gravure cylinder (I) is 10 to 30 cc/m$^2$, and preferably 10 to 27 cc/m$^2$. When the cell volume is the same or greater than 10 cc/m$^2$, a sufficient amount of coating of the adhesives is ensured. As a result, good adhesive property and favorable appearance quality can be obtained. In addition, when the cell volume is the same as or less than 30 cc/m$^2$ time required for curing is short and workability is satisfactory. In addition, no tunneling phenomenon occurs in a laminate that is obtained after lamination.

Cell depth of the gravure cylinder (I) is not specifically limited. However, it is preferably 25 to 100 μm, and more preferably 27 to 85 μm. When the cell depth is the same as or greater than 25 μm, no scratch pattern is formed on a coated surface, and when it is the same as or less than 100 μm, the time required for curing is short.

Cell configuration of the gravure cylinder (I) is not specifically limited. However, examples thereof include a pyramid cell, a lattice cell, an helicoidally and the like.

Method of making the gravure cell (I) is not specifically limited, and it can be prepared according to a typical cell making method. Examples thereof include a laser cylinder making method, an electronic engraving cylinder making method such as Helio, Ohio, Valcus, etc., a plate engraving method based on reverse engraving, a conventional cylinder making method based on corrosion, and the like.

(Gravure Cylinder (II))

Next, a gravure cylinder which is engraved with an electronic engraving machine to have a stylus angle of 120 to 140° and the screen number of gravure cylinder of 120 to 270 lines/inch will be explained.

The gravure cylinder (II) is a cylinder which is engraved by using an electronic engraving machine. Helio, made in Germany, Ohio, made in America, and Valcus, made in Japan and the like can be mentioned as the electronic engraving machine. Helio is the most representative type. Compared to an engraved cylinder obtained according to reverse engraving or a corrosion cylinder obtained according to corrosion method, the gravure cylinder engraved by using an electronic engraving machine has a distinguished shape in which opening of a cell (concave part) is wide and a non-engraved region between one cell and another cell. i.e., so-called "bank," is formed narrowly. As a result, even when adhesives with high content of solid matter are coated on a film, favorable leveling of the adhesives is achieved on the film.

The screen number of gravure cylinder in the gravure cylinder (II) is 120 to 270 lines/inch, and preferably 135 to 255 lines/inch. When the screen number of gravure cylinder is the same or greater than 120 lines/inch, no stripe pattern is formed in the direction of coating flow, and therefore the appearance quality of a laminate obtained after lamination is favorable. In addition, when the screen number of gravure cylinder is the same or less than 270 lines/inch, a sufficient amount of coating is ensured. As a result, thanks to good adhesive property, favorable appearance quality can be obtained.

Furthermore, the stylus angle of the gravure cylinder (II) is 120 to 140°, and preferably 120 to 130°. When the stylus angle of the gravure cylinder (II) is the same or greater than 120°, no stripe pattern is formed in the direction of coating flow, and therefore the appearance quality of a laminate that is obtained after lamination is favorable. In addition, since the durability of a blade of a diamond cutter (i.e., stylus) is excellent and is hard to get deteriorated during cell making, it is advantageous in terms of cost. In addition, when the stylus angle is the same or less than 140°, gravure cells having the sufficient cell depth are obtained, so that a sufficient amount of coating is ensured. As a result, good adhesive property and favorable appearance quality can be obtained.

Figure 1:
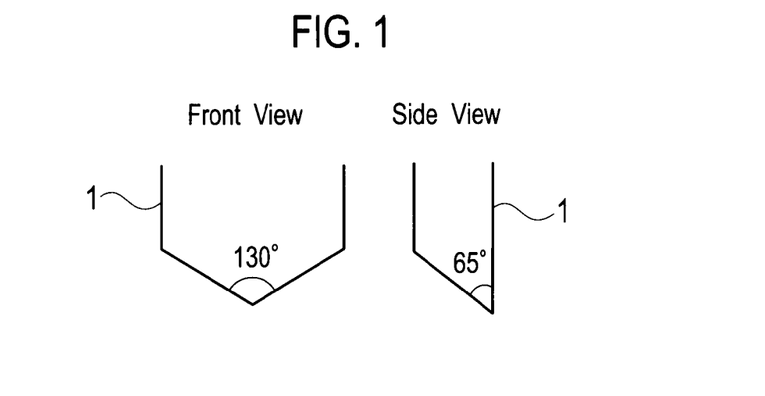
FIG. 1 is a diagram illustrating a diamond cutter (i.e., stylus)

The stylus angle corresponds to an angle of a blade of an electronic engraving machine. As the front end angle of a gravure cell (i.e., concave part) of a gravure cylinder which is engraved by using the engraving machine is the same as the blade angle, the front end angle of the cell also can be called the stylus angle. A cell is formed by engraving an inverted pyramidal shape on a surface of a body of the gravure cylinder using a diamond cutter blade (i.e., stylus). As shown in FIG. 1, the diamond blade 1 has a frond end with a sharp shape, and by appropriately selecting the front end angle of the diamond blade, the front end angle of the cell can be adjusted to a desired value.

Figure 2:
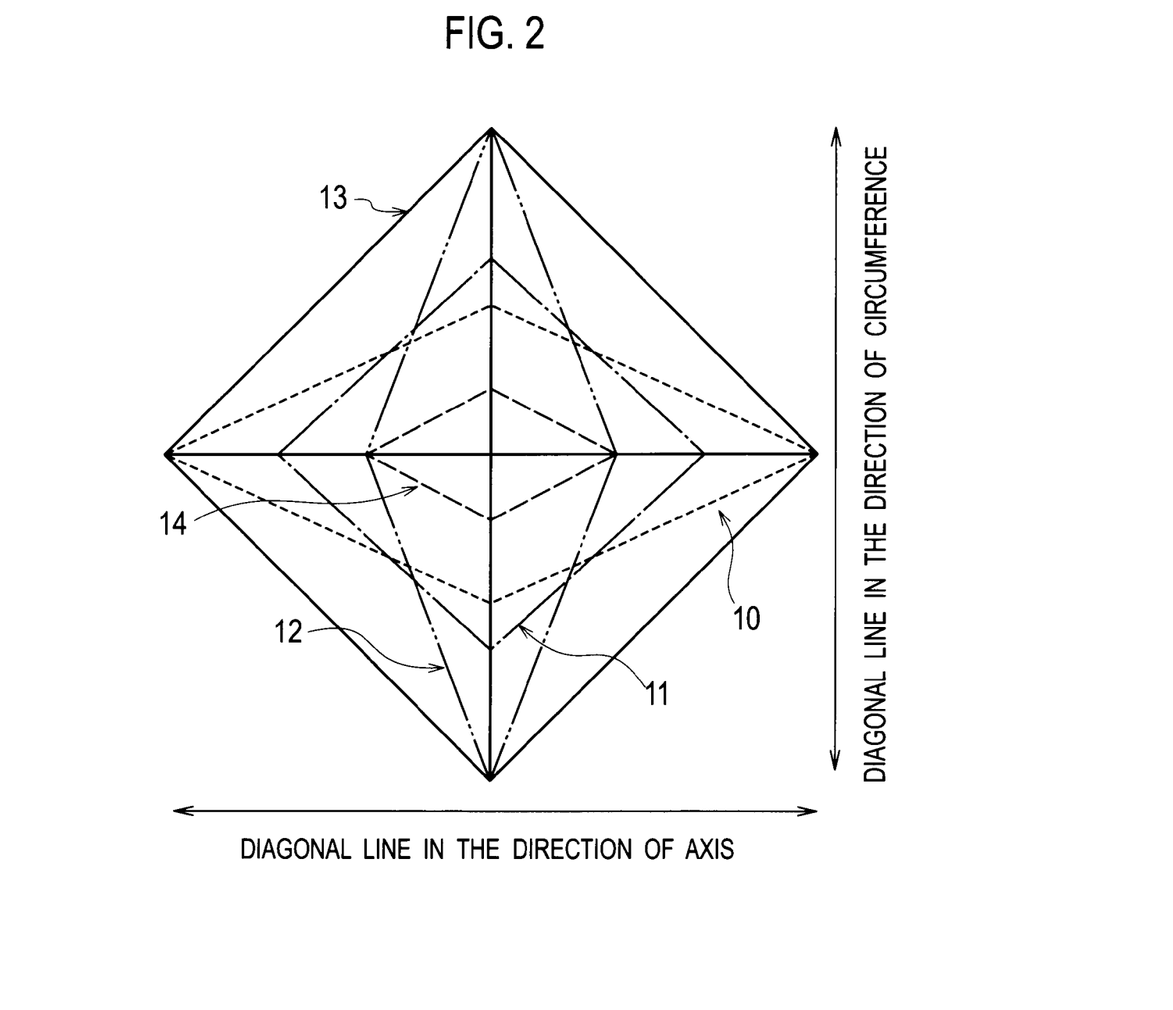
FIG. 2 is a schematic diagram illustrating a cell shape that is engraved by an electronic engraving machine.

A schematic diagram of the cell shape is shown in FIG. 2. As for the cell shape, there are five kinds as follows: compressed (10), normal (11), elongate (12), coarse (13), and fine (14). In general, four kinds comprising the compressed (10), the elongate (12), the coarse (13) and the fine (14) are most commonly used. On a cylinder, a cell is engraved as a concave part of rectangular pyramid by using an electronic engraving machine. In FIG. 2, "diagonal line in the direction of axis" indicates the diagonal line of a cell in the direction of axis of cylinder, while "diagonal line in the direction of circumference" indicates the diagonal line of a cell in the direction of circumference of cylinder.

In a strict sense, the cell shape is determined by the angle for cell engraving and the relative length of diagonal line in the cell. The angle for cell engraving means an angle that is formed by crossing of a line which passes through the intersection point of the diagonal lines of the cell which are continued in the direction of cylinder axis and a line which passes through the intersection point of the diagonal lines of the cell which are continued in the direction oblique to the cylinder axis.

Depth and volume of a cell are determined by a cell shape, the screen number of gravure cylinder, a stylus angle, and a length of a diagonal line of a cell. Furthermore, even for the cells having the same stylus angle and the same screen number of gravure cylinder, the cell depth, the cell volume and the length of the diagonal line of a cell may vary depending on the shape of the cell. An example in which the screen number of gravure cylinder is 175 lines/inch and the stylus angle is 120° is described in Table 1, while another example in which the screen number of gravure cylinder is 175 lines/inch and the stylus angle is 130° is described in Table 2.

TABLE 1

175 lines/inch and stylus angel of 120°

| Cell shape | Diagonal line in the direction of axis($\mu$m) | Diagonal line in the direction of circumference($\mu$m) | Depth ($\mu$m) | Volume (cc/m$^2$) |
| --- | --- | --- | --- | --- |
| Compressed | 180 | 170 | 52 | 23 |
| Elongate | 140 | 205 | 40 | 17 |
| Coarse | 180 | 255 | 52 | 22 |
| Fine | 120 | 125 | 35 | 15 |

TABLE 2

175 lines/inch and stylus angel of 130°

| Cell shape | Diagonal line in the direction of axis($\mu$m) | Diagonal line in the direction of circumference($\mu$m) | Depth ($\mu$m) | Volume (cc/m$^2$) |
| --- | --- | --- | --- | --- |
| Compressed | 180 | 170 | 42 | 18 |
| Elongate | 140 | 205 | 32 | 14 |
| Coarse | 180 | 255 | 42 | 18 |
| Fine | 120 | 125 | 28 | 12 |

Cell volume of the gravure cylinder (II) is not specifically limited. It is preferably 10 to 30 cc/m$^2$ and more preferably 10 to 27 cc/m$^2$. When the cell volume is the same as or greater than 10 cc/m$^2$ a sufficient amount of coating of the adhesives is ensured. As a result, a good adhesive property can be obtained. In addition, when the cell volume is the same as or less than 30 cc/m$^2$, time required for curing is short, thus workability is favorable. In addition, no tunneling phenomenon occurs in a Laminate that is obtained after lamination. Meanwhile, the cell depth of the gravure cylinder is not specifically limited. However, it is preferably 20 to 100 $\mu$m, and more preferably 25 to 85 $\mu$m. When the cell depth is the same or greater than 25 $\mu$m, no scratch pattern is formed on a coated surface, and when it is the same or less than 100 $\mu$m, the time required for curing is short.

(Ceramic Roll)

Next, a ceramic roll in which the screen number of gravure cylinder is 135 to 350 lines/inch and a cell volume is 10 to 30 cc/m$^2$ will be explained.

In a ceramic roll, the screen number of gravure cylinder is 180 to 350 lines/inch, and preferably 180 to 300 lines/inch.

When adhesives having a solid matter content of 35% by weight or above is coated using a ceramic roll in which the screen number of gravure cylinder is the same or greater than 135 lines/inch, a stripe pattern in the direction of coating flow does not occur, and therefore the laminate obtained after lamination is favorable in terms of appearance quality.

Meanwhile, a ceramic roll having the screen number of gravure cylinder of the same or less than 350 lines/inch can be prepared to have a cell volume of the same or greater than 10 cc/m$^2$, and therefore a sufficient amount of coating is ensured. As a result, good adhesive property and favorable appearance quality can be obtained.

Cell volume of a ceramic roll is 10 to 30 cc/m$^2$, and preferably 10 to 27 cc/m$^2$. When the cell volume is the same or greater than 10 cc/m$^2$, a sufficient amount of coating of the adhesives is ensured. As a result, good adhesive property and favorable appearance quality can be obtained. In addition, when the cell volume is the same as or less than 30 cc/m$^2$ time required for curing is short, thus workability is favorable. In addition, no tunneling phenomenon occurs in a laminate that is obtained after lamination.

Cell depth of a ceramic roll is not specifically limited. However, it is preferably 25 to 100 $\mu$m, and more preferably 27 to 85 $\mu$m. When the cell depth is the same or greater than 25 $\mu$m, no scratch pattern is formed on a coated surface and, when it is the same or less than 100 $\mu$m, the time required for curing is short.

Figure 3A:
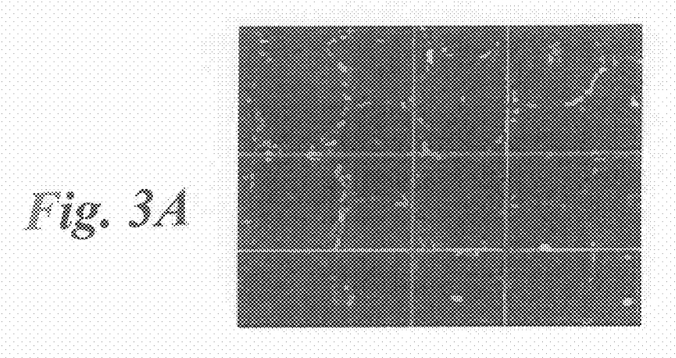
FIG. 3 is a schematic diagram illustrating a cell shape of a ceramic roll that is engraved by laser.
Figure 3B:
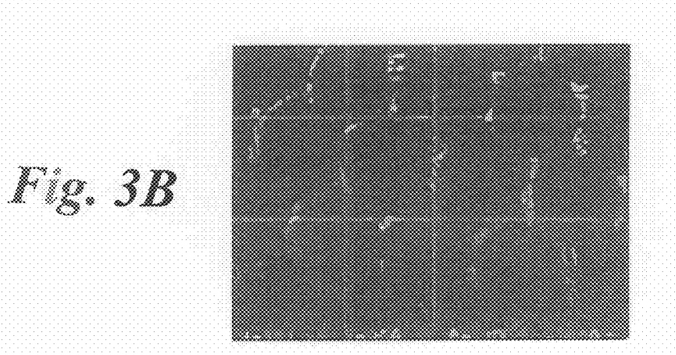
Figure 3C:
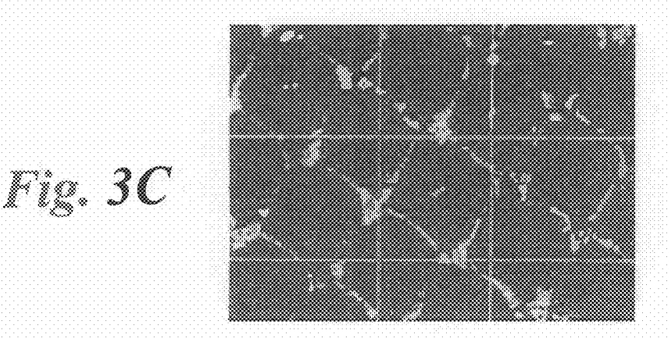

Shape of a ceramic roll is not specifically limited and examples thereof include a honeycomb pattern, a diamond pattern, a helical pattern and the like. In FIG. 3, (a) illustrates a honeycomb pattern (cell angle=30°), (b) illustrates a honeycomb pattern (cell angle=60°) and (c) illustrates a diamond pattern (cell angle=45°).

Method of making a ceramic roll is not specifically limited, and it can be prepared according to a typical cell making method. For example, undercoating is applied to an iron rod to facilitate ceramic coating, and a ceramic layer is coated thereon to have a thickness of 0.3 to 0.5 mm according to a plasma spray method. After that, the surface is smoothened by using a diamond wheel, and engraving is carried out using a laser engraving machine by following the designated screen number, volume and pattern.

(Adhesives)

The adhesives that are used for the dry lamination method of the present invention are not specifically limited if the adhesives diluted in a solvent include a solid matter content of 35% by weight or above. In addition, either of organic solvent-based adhesives and water-based adhesives can be used. When the solid matter content is 35% by weight or above as described above, a sufficient amount of coating is ensured, resulting a good adhesive property. The solid matter content is preferably 35 to 55% by weight and more preferably 35 to 50% by weight.

As for the organic solvent-based adhesives, a resin having adhesive property which is solubilized in an organic solvent can be mentioned. As an example of such resin, a polyester type resin, a polyether type resin, a polyester ether type resin, a polyurethane type resin, a polyester urethane type resin, a polyether urethane type resin, a polyester ether type resin, and a polyester ether urethane type resin can be mentioned. These adhesives can be used alone, but they are generally used in combination with a curing agent including a polyisocyanate compound so that they can be used as two-component curing type adhesives.

As for the polyester type resin, a polyester type resin which is obtained by reacting dibasic acids or their dialkyl ester or their mixture with glycols or their mixture, or a polyester type resin which is obtained by ring-opening polymerizaiton of lactones can be mentioned. As for the dibasic acids, for example, terephthalic acid, isophthalic acid, adipic acid, azelaic acid and sebacic acid can be mentioned. As for the glycols, for example, ethylene glycol, propylene glycol, diethylene glycol, butylene glycol, neopentyl glycol, 1,6-hexanediol, 3-methyl-2,5-pentanediol, 3,3'-dimethylolheptane, polyoxyethylene glycol, polyoxypropylene glycol and polytetramethylene ether glycol can be mentioned. As for the lactones, polycaprolactone, polyvalerolactone and poly(β-methyl-γ-valerolactone) can be mentioned.

As for the polyether type resin, a polyether type resin which is obtained by polymerization of an oxy compound using an initiator can be mentioned. As for the oxy compound, for example, ethylene oxide, propylene oxide, butylenes oxide, and tetrahydrofuran can be mentioned. As for the initiator, for example, water and a low-molecular weight polyol such as ethylene glycol, propylene glycol, trimethylol propane, glycerin and the like can be mentioned.

As for the polyether ester type resin, a polyether ester type resin which is obtained by reacting dibasic acids or their dialkyl ester or their mixture with the polyether type resin described above can be mentioned. As for the dibasic acids, for example, terephthalic acid, isophthalic acid, adipic acid, azelaic acid and sebacic acid can be mentioned.

The polyurethane type resin is obtained by reacting polyol having a urethane bond in one molecule with organic polyisocyanate. As for the polyol, for example, polyether polyol, polyester polyol, polyether ester polyol having number average molecular weight of 200 to 20,000 can be mentioned (hereinbelow, referred to as organic polyol (1)). The ratio of NCO/OH for the reaction is less than 1, and preferably 0.9 or less. As for the polyol described above, a polyol having a carboxyl group in the molecule (at the middle or terminal region of a molecule) can be used (hereinbelow, referred to as organic polyol (2)). Preferably, the organic polyol (2) is obtained by reacting the organic polyol (1) described above with polybasic acid or its anhydride. As for the organic polyol (1) which is used for this reaction, a polyol including at least two hydroxyl groups at the terminal region of a molecule and having a number average molecular weight of 1,000 to 100,000, and preferably 3,000 to 15,000 is used. When it is the same as or greater than 1,000, agglomeration is enough. When it is the same as or less than 100,000, in terms of synthesis, reacting polybasic acid or its anhydride at the terminal region of the molecule can be easily carried out, and there is no risk for viscosity increase or gelation. As for the polybasic acid or its anhydride, for example, an aromatic polybasic acid such as phthalic acid, trimellitic acid, pyromellitic acid and the like, and their anhydrides can be mentioned. Phthalic acid anhydride, trimellitic acid anhydride, pyromellitic acid anhydride and the like, which are the anhydride of said acids, are particularly preferable. As for the anhydride, ethylene glycol bisanhydrotrimellitate, glycerol trisanhydrotrimellitate, ethylene glycol bisanhydropyromellitate, glycerol trisanhydropyromellitate that are derived from the anhydrides described above, and derivatives in which maleic acid anhydride is added to abietic acid consisting of a rosin component, a $C_{10}H_{16}$ diene compound or their mixture can be used. Synthesis of the organic polyol (2) may be carried out according to a two-step reaction in which the organic polyol (1) is synthesized first and then polybasic acid or its anhydride, preferably polybasic acid anhydride is added thereto under heating. Alternatively, at the time of synthesizing organic polyol, the organic polyol (2) may be synthesized in a single step from polyhydric carboxylic acid and polyhydric alcohol. The reaction with these polybasic acid anhydrides is effective for improving an adhesive property of adhesive composition, for example, hot water resistance, oil resistance, acid resistance and the like. For the reaction between the organic polyol and the polybasic acid anhydride, it is necessary to control the reaction temperature to be 200° C. or less, and preferably in the range of 150 to 180° C. so that the esterification based on ring-opening reaction of the polybasic acid anhydride can be a major reaction. The reaction ratio between the organic polyol and the polybasic acid anhydride should be set to consume 40% or more of the hydroxyl groups that are contained in the organic polyol. Herein, the term "%" is based on the number of hydroxyl groups that are contained in the organic polyol molecule. When the value is 40% or above the resulting composition has excellent acid resistance. In addition, even when aliphatic polyhydric carboxylic acid anhydride is used as polybasic acid anhydride, a carboxylic group can be similarly introduced to a molecule. However, improved acid resistance cannot be obtained from this case. As such, in terms of acid resistance, use of aliphatic polyhydric carboxylic acid anhydride is not preferable. In addition, when polyester polyol or polyether ester polyol is used for the organic polyol (1), if only an aromatic polyhydric carboxylic acid is employed as a carboxylic acid, i.e., a starting material for said polyols, sometimes the control of the physical properties of the organic polyol (1) may arise as a problem. In particular, trivalent or tetravalent polyhydric carboxylic acid forms the organic polyol (1) in branched form, which can be easily gelified. In addition, since the aromatic polyhydric carboxylic acid has a sublime property, the sublimed product may adhere to a reaction vessel or a dehydration apparatus during the synthesis of the organic polyol (1), causing a difficulty in production. In this regard, by using an organic polyol wherein a carboxy group is included in the molecule (i.e., the organic polyol (2)), the problems described before can be avoided. As for the organic polyisocyanate, for example, a monomer for polyisocyanate including an aliphatic diisocyanate such as trimethylene diisocyanate, tetramethylene diisocyanate, hexamethylene diisocyanate, 1,2-propylenediisocyanate, 1,2-butylenediisocyanate, 2,3-butylenediisocyanate, 1,3-butylenediisocyanate, 2,4,4- or 2,2,4-trimethylhexamethylene diisocyanate, 2,6-diisocyanatemethylcaproate and the like, an alicyclic diisocyanate such as 1,4-cyclohexane diisocyanate, 1,3-cyclohexane diisocyanate, 3-isocyanatemethyl-3,5,5-trimethylcyclohexylisocyanate, 4,4'-methylene bis(cyclohexylisocyanate), methyl-2,4-cyclohexane diisocyanate, methyl 2,6-cyclohexane diisocyanate, 1,4-bis(isocyanatemethyl)cyclohexane, 1,3-bis(isocyanatemethyl)cyclohexane and the like, an aromatic diisocyanate such as m-phenylene diisocyanate, p-phenylene diisocyanate, 4,4'-diphenyldiisocyanate, 1,5-naphthalene diisocyanate, 4,4'-diphenylmethane diisocyanate, 2,4- or 2,6-tolylene diisocyanate or mixture thereof, 4,4'-toluidine diisocyanate, dianisidine diisocyanate, 4,4'-diphenylether diisocyanate and the like, 1,3- or 1,4-xylylene diisocyanate or mixture thereof, ω,ω'-diisocyanate-1,4-diethylbenzene, an aromatic aliphatic diisocyanate such as 1,3- or 1,4-bis(1-isocyanate-1-methylethyl)benzene or mixture thereof, organic triisocyanate such as triphenylmethane-4,4',4"-triisocyanate, 1,3,5-triisocyanatebenzene, 2,4,6-triisocyanate toluene and the like, organic tetraisocyanate such as 4,4'-diphenyldimethylmethane-2,2'-5,5'-tetraisocyanate and the like, a dimer or trimer derived from the monomer for polyisocyanate as described above, biuret, alophanate, polyisocyanate having 2,4,6-oxadiazine trione ring that is obtained from the monomer for polyisocyanate described above and carbon dioxide gas, for example, an adduct with a low molecular weight polyol having a molecular weight of less than 200 such as ethylene glycol, propylene glycol, butylene glycol, hexylene glycol, neopentyl glycol, 1,6-hexanediol, 3-methyl-1,5-pentanediol, 3,3'-dimethylol propane, cyclohexane dimethanol, diethylene glycol, triethylene glycol, dipropylene glycol, glycerol, trimethylol propane, pentaerythritol, sorbitol and the like, or an adduct with polyester polyol, polyether ester polyol, polyester amide polyol, polycaprolactone polyol, polyvalerolactone polyol, acrylpolyol, polycarbonate polyol, polyhydroxy alkane, castor oil, or polyurethane polyol having a molecular weight of 200 to 20,000 can be mentioned.

As for the polyisocyanate compound which is used as a curing agent for organic solvent-based adhesives, the polyisocyanate described above can be mentioned.

Furthermore, as for the water-based adhesives, water-based polyurethane adhesives, water-based acrylic adhesives, water-based polyester adhesives, water-based polyether adhesives and the like can be mentioned.

As for the water-based polyurethane adhesives, self-emulsifiable water dispersion type or water-soluble water-based urethane adhesives in which a polyurethane compound is either dispersed or dissolved in water may be used. The polyurethane compound indicates a polyurethane compound having a carboxy group that is obtained by reacting a polyol compound including no carboxy group in a molecule and a polyol compound including a carboxy group in a molecule with a polyisocyanate compound. In addition, water dispersion type polyurethane adhesives in which a polyurethane compound is forced to get emulsified in water with an aid of a surfactant may be also used. The polyurethane compound for this case is obtained by reacting a polyol compound including no carboxy group in a molecule with a polyisocyanate compound. As for the polyol compound including no carboxy group in a molecule that is used for water-based urethane adhesives, for example, polyester polyol, polyether polyol, polyether polyester polyol, polyurethane polyol, polyester amide polyol, acrylic polyol, polycarbonate polyol, polyhydroxyalkane, castor oil, and the like can be mentioned. As for the polyol compound including a carboxy group, for example, dimethylol propionic acid, dimethylol butanoic acid, and the like can be mentioned but dimethylol butanoic acid is particularly preferable. As for the polyisocyanate compound, tolylene diisocyanate, 4,4'-diphenylmethane diisocyanate, 1,6-hexamethylene diisocyanate, isophorone diisocyanate, 1,5-naphthalene diisocyanate, xylylene diisocyanate and the like can be mentioned, but tolylene diisocyanate and 4,4'-diphenylmethane diisocyanate are particularly preferable.

The water-based acrylic adhesives are water-based acrylic adhesives that are obtained by emulsification polymerization of an acrylic monomer including no carboxyl group and an acrylic acid monomer including a carboxyl group.

(Dry Lamination Method)

According to the dry lamination method of the present invention, the adhesives described above are coated on a film by a gravure process, the solvent is volatilized, and the resulting film is adhered with another film to obtain a laminate. For the coating with adhesives, the gravure plate (I) or the gravure plate (II) described above is used. For the volatilization of the solvent, a dryer may be used. Condition for drying is not specifically limited, however, the drying temperature is generally between 50 and 90° C.

(Film)

The film that is used for the dry lamination method of the present invention is not specifically limited. As an example, a plastic film like polyester, polyamide, polyethylene, polypropylene, etc., a metal deposited film using aluminum, silicone dioxide, aluminum oxide and the like, and a thin metal film like thin aluminum film, etc. can be mentioned. With respect to a combination thereof, combination between said plastic films, combination between plastic film and metal deposited film, and combination between plastic film and thin metal film, etc. can be mentioned. Thickness of the film is not limited either but it is in general between 5 and 200 μm.

(Laminate)

Figure 4:
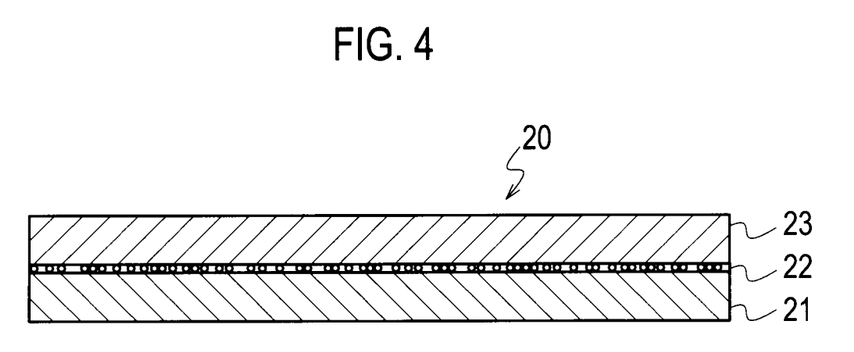
FIG. 4 is a schematic diagram illustrating the laminate of the present invention.

According to the dry lamination method of the present invention, as shown in the schematic diagram of FIG. 4, a laminate 20 is obtained in which an adhesives layer 22 is formed on a first film 21 and a second film 23 is further formed thereon.

According to the dry lamination method of the present invention, by using adhesives having high content of solid matter, the dry coating amount of adhesives is guaranteed to be in the range of 1 to 8 $g/m^2$. As a result, a laminate with an excellent adhesive property is obtained. In addition, even though adhesives having high content of solid matter are used, appearance of the laminate is very satisfactory. As a result, the method can be particularly appropriately used in food products industry.

EXAMPLE

Hereinbelow, the present invention will be explained in greater detail with reference to the Examples. However, it is evident that the present invention is not limited by the Examples.

For Example A-1 to Example A-4, the gravure cylinder (I) was used. For Example B-1 to Example B-6, the gravure cylinder (II) was used. Further, for Example C-1 to Example C-4, a ceramic roll was used.

Example A-1

By using a gravure cylinder having the screen number of 180 lines/inch and a cell volume of 19 $cc/m^2$ that is prepared based on a reverse engraving process, a biaxially-oriented polypropylene film having a thickness of 20 μm (OPP; PYLEN FILM OT P-2161, manufactured by Toyobo Co., Ltd.) was coated with a high solid type organic solvent-based adhesives (TM-550, polyester type adhesive, manufactured by Toyo-Morton, Ltd) by a dry laminator (FL2 type, manufactured by FUJI KIKAI KOGYO Co., Ltd.) to have a solid matter content of 45% by weight. The solvent was volatilized using a dryer (at temperatures of 60° C., 70° C., 80° C., and 80° C.). After that, a cast polypropylene film having a thickness of 25 μm (CPP; GHC#25, manufactured by TOHCELLO CO., LTD.) was laminated thereto at 50° C. using a nip roll to obtain a laminate.

The laminate obtained above was cut to have a size of 10 cm×10 cm, and the weight of the laminate (A(g)) was measured using a fine balance. After that, the laminate was peeled off, and the adhesives adhered on each peeled surface were completely wiped out using ethyl acetate. The film obtained after wiping of the adhesives was dried for 5 minutes at 80° C. Then, the weight of each film obtained after peeling (B(g)) was measured using a fine balance. The dry coating amount was calculated according to the following equation, and it was found to be 2.8 g/m².

Dry coating amount(g/m²)=(A−B)/0.01

Further, appearance of the resulting laminate was visually determined. As a result, it was found that the surface was uniform and satisfactory, and occurrence of a tunneling phenomenon was not observed.

Example A-2

Except that, as a gravure cylinder, a cylinder having the screen number of 200 lines/inch and a cell volume of 14 cc/m² that is prepared according to a laser process is used and as adhesives, water-based acrylic adhesives (ROBOND manufactured by Rohm and Haas) are used in a solid matter content of 45% by weight, a laminate was obtained in the same manner as Example A-1. The dry coating amount of the adhesives was 2.1 g/m². Then, appearance of the resulting laminate was visually determined. As a result, it was found that the surface was uniform and satisfactory, and occurrence of a tunneling phenomenon was not observed.

Example A-3

Except that, as a gravure cylinder, a cylinder having the screen number of 250 lines/inch and a cell volume of 16 cc/m² that is prepared according to a cell making process based on electronic engraving (i.e., Helio plate) is used (stylus angle=145°) and as adhesives, water-based acrylic adhesives (ROBOND L-250, manufactured by Rohm and Haas) are used in a solid matter content of 45% by weight, a laminate was obtained in the same manner as Example A-1. The dry coating amount of the adhesives was 2.4 g/m². Then, appearance of the resulting laminate was visually determined. As a result, it was found that the surface was uniform and satisfactory, and occurrence of a tunneling phenomenon was not observed.

Example A-4

Except that, as a gravure cylinder, a cylinder having the screen number of 137 lines/inch and a cell volume of 26 cc/m² that is prepared according to a cell making process based on electronic engraving (i.e., Helio plate) was used (stylus angle=145°) and as adhesives, high solid type organic solvent-based adhesives (TM-550, polyester type adhesives, manufactured by Toyo-Morton, Ltd.) were used in a solid matter content of 45% by weight, a laminate was obtained in the same manner as Example A-1. The dry coating amount of the adhesives was 3.8 g/m². Then, appearance of the resulting laminate was visually determined. As a result, it was found that the surface was uniform and satisfactory, and occurrence of a tunneling phenomenon was not observed.

Comparative Example A-1

Except that, as a gravure cylinder, a cylinder having the screen number of 120 lines/inch and a cell volume of 41 cc/m² that was prepared according to a reverse engraving process was used and as adhesives, water-based acrylic adhesives (ROBOND L-250, manufactured by Rohm and Haas) were used in a solid matter content of 45% by weight, a laminate was obtained in the same manner as Example A-1. The dry coating amount of the adhesives was 6.0 g/m². Then, appearance of the resulting laminate was visually determined. As a result, occurrence of a tunneling phenomenon was observed.

Comparative Example A-2

Except that, as a gravure cylinder, a cylinder having the screen number of 300 lines/inch and a cell volume of 8 cc/m² that was prepared according to a reverse engraving process was used and as adhesives, high solid type organic solvent-based adhesives (TM-550, ester type adhesives, manufactured by Toyo-Morton, Ltd.) was used in a solid matter content of 45% by weight, a laminate was obtained in the same manner as Example A-1. The dry coating amount of the adhesives was 1.2 g/m². Then, appearance of the resulting laminate was visually determined. As a result, scratches were found.

Comparative Example A-3

Except that, as a gravure cylinder, a cylinder having the screen number of 120 lines/inch and a cell volume of 23 cc/m² that was prepared according to a reverse engraving process was used and as adhesives, high solid type organic solvent-based adhesives (TM-550, ester type adhesives, manufactured by Toyo-Morton, Ltd.) were used in a solid matter content of 45% by weight, a laminate was obtained in the same manner as Example A-1. The dry coating amount of the adhesives was 3.4 g/m². Then, appearance of the resulting laminate was visually determined. As a result, occurrence of a stripe pattern was observed.

Comparative Example A-4

Except that, as a gravure cylinder, a cylinder having the screen number of 140 lines/inch and a cell volume of 34 cc/m² that is prepared according to a reverse engraving process was used and as adhesives, high solid type organic solvent-based adhesives (TM-550, ester type adhesives, manufactured by Toyo-Morton, Ltd.) were used in a solid matter content of 45% by weight, a laminate was obtained in the same manner as Example A-1. The dry coating amount of the adhesives was 5.1 g/m². Then, appearance of the resulting laminate was visually determined. As a result, occurrence of a tunneling phenomenon was observed.

Comparative Example A-5

Except that, as a gravure cylinder, a cylinder having the screen number of 200 lines/inch and a cell volume of 8 cc/m² that was prepared according to a cell making process based on electronic engraving (i.e., Helio plate) was used (stylus angle=145°) and as adhesives, water-based acrylic adhesives (ROBOND L-250, manufactured by Rohm and Haas) were used in a solid matter content of 45% by weight, a laminate was obtained in the same manner as Example A-1. The dry coating amount of the adhesives was 1.2 g/m². Then, appearance of the resulting laminate was visually determined. As a result, scratches were found.

Comparative Example A-6

Except that, as a gravure cylinder, a cylinder having the screen number of 300 lines/inch and a cell volume of 12 cc/m² that was prepared according to a cell making process based on electronic engraving (i.e., Helio plate) was used (stylus angle=145°) and as adhesives, water-based acrylic adhesives (ROBOND L-250, manufactured by Rohm and Haas) were used in a solid matter content of 45% by weight, a laminate was obtained in the same manner as Example A-1. The dry coating amount of the adhesives was 1.8 g/m². Then, appearance of the resulting laminate was visually determined. As a result, scratches were found.

The results obtained from the above are described in Table 3.

In addition, regarding the "cell depth" mentioned in Table 3, it is calculated from the screen number of gravure cylinder and cell volume.

sured using a fine balance. After that, the laminate was peeled off, and the adhesives adhered on each peeled surface were completely wiped out using ethyl acetate. The film obtained after wiping the adhesives was dried for 5 minutes at 80° C. Then, the weight of each film obtained after peeling (B(g)) was measured using a fine balance. The dry coating amount was calculated according to the following equation, and it was found to be 2.8 g/m².

$$\text{Dry coating amount}(g/m^2) = (A-B)/0.01$$

TABLE 3

| | Example | | | | Comparative Example | | | | | |
|---|---|---|---|---|---|---|---|---|---|---|
| | A-1 | A-2 | A-3 | A-4 | A-1 | A-2 | A-3 | A-4 | A-5 | A-6 |
| Adhesive | Organic solvent type | Water-based type | Water-based type | Organic solvent type | Water-based type | Organic solvent type | Organic solvent type | Organic solvent type | Water-based type | Water-based type |
| Solid matter content | 45 | 45 | 45 | 45 | 45 | 45 | 45 | 45 | 45 | 45 |
| Manufacturing method of gravure plate | Reverse engraving | Laser | Helio | Helio | Reverse engraving | Reverse engraving | Reverse engraving | Reverse engraving | Helio | Helio |
| Plate depth (μm) | 45 | 29 | 35 | 54 | 85 | 20 | 75 | 75 | 30 | 24 |
| Gravure line (line/inch) | 180 | 200 | 250 | 137 | 120 | 300 | 120 | 140 | 200 | 200 |
| Cell volume (cc/m²) | 19 | 14 | 16 | 26 | 41 | 8 | 23 | 34 | 8 | 12 |
| Dry coating amount(g/m²) | 2.8 | 2.1 | 2.4 | 3.8 | 6.0 | 1.2 | 3.4 | 5.1 | 1.2 | 1.8 |
| Appearance | Good | Good | Good | Good | Tunneling phenomenon | Scratches | Stripe pattern | Tunneling phenomenon | Scratches | Scratches |

As described in Table 3, regarding the appearance of laminates that were obtained after lamination in Example A-1 to Example A-4, the surfaces were uniform and satisfactory, and occurrence of a tunneling phenomenon was not observed. On the other hand, in Comparative example A-1 to Comparative example A-6 in which the screen number of gravure cylinder and/or cell volume are not within the range of the present invention, the appearance of laminates after lamination shows a stripe pattern or scratches, and therefore no satisfactory surfaces were obtained. Furthermore, occurrence of a tunneling phenomenon was observed.

Example B-1

By using a cylinder by Herio having the screen number of 175 lines/inch, a stylus angle of 120°, compressed, a diagonal line in the direction of axis of 180 μm, a diagonal line in the direction of circumference of 170 μm, and a cell depth of 52 μm that is prepared by a cell making process based on electronic engraving (i.e., Helio plate), a biaxially-oriented polypropylene film having a thickness of 20 μm (OPP; PYLEN FILM OT P-2161, manufactured by Toyobo Co., Ltd.) was coated with a high solid type organic solvent-based adhesives (TM-550, polyester type adhesives, manufactured by Toyo-Morton, Ltd.) by a dry laminator (FL2 type, manufactured by FUJI KIKAI KOGYO Co.) to have a solid matter content of 45% by weight. The solvent was volatilized using a dryer (at temperatures of 60° C., 70° C., 80° C., 80° C.). After that, a cast polypropylene film having a thickness of 25 μm (CPP; GHC#25, manufactured by TOHCELLO CO., LTD.) was laminated thereto at 50° C. using a nip roll according to obtain a laminate.

The laminate obtained above was cut to have a size of 10 cm×10 cm, and the weight of the laminate (A(g)) was mea- Further, appearance of the resulting laminate was visually determined. As a result, it was found that the surface was uniform and satisfactory.

Example B-2

Except that, as a cylinder by Helio, a cylinder having the screen number of 200 lines/inch, a stylus angle of 120°, elongate, a diagonal line in the direction of axis of 125 μm, diagonal line in the direction of circumference of 180 μm, and a cell depth of 36 μm was used and as adhesives, water-based acrylic adhesives (ROBOND L-250 manufactured by Rohm and Haas) were used in a solid matter content of 45% by weight, a laminate was obtained in the same manner as Example B-1. The dry coating amount of the adhesives was 2.2 g/m². Then, appearance of the resulting laminate was visually determined. As a result, it was found that the surface was uniform and satisfactory.

Example B-3

Except that, as a cylinder by Helio, a cylinder having the screen number of 250 lines/inch, a stylus angle of 130°, elongate, a diagonal line in the direction of axis of 98 μm, a diagonal line in the direction of circumference of 145 μm, and a cell depth of 22 μm was used and as adhesives, water-based acrylic adhesives (ROBOND L-250, manufactured by Rohm and Haas) were used in a solid matter content of 45% by weight, a laminate was obtained in the same manner as Example B-1. The dry coating amount of the adhesives was 1.5 g/m². Then, appearance of the resulting laminate was visually determined. As a result, it was found that the surface was uniform and satisfactory.

Example B-4

Except that, as a cylinder by Helio, a cylinder having the screen number of 150 lines/inch, a stylus angle of 130°, coarse, a diagonal line in the direction of axis of 210 μm, a diagonal line in the direction of circumference of 300 and a cell depth of 49 μm was used and as adhesives, high solid type organic solvent-based adhesives (TM-550, polyester type adhesives, manufactured by Toyo-Morton, Ltd.) were used in a solid matter content of 45% by weight, a laminate was obtained in the same manner as Example B-1. The dry coating amount of the adhesives was 2.8 g/m². Then, appearance of the resulting laminate was visually determined. As a result, it was found that the surface was uniform and satisfactory.

Comparative Example B-1

Except that, as a cylinder by Helio, a cylinder having the screen number of 100 lines/inch, a stylus angle of 130°, compressed, a diagonal line in the direction of axis of 310 μm a diagonal line in the direction of circumference of 305 μm, and a cell depth of 72 μm was used and as adhesives, high solid type organic solvent-based adhesives (TM-550, polyester type adhesives, manufactured by Toyo-Morton, Ltd.) were used in a solid matter content of 45% by weight, a laminate was obtained in the same manner as Example B-1. The dry coating amount of the adhesives was 5.2 g/m². Then, appearance of the resulting laminate was visually determined. As a result, occurrence of a stripe pattern was observed.

Comparative Example B-2

Except that, as a cylinder by Helio, a cylinder having the screen number of 350 lines/inch, a stylus angle of 130°, compressed, a diagonal line in the direction of axis of 85 μm, a diagonal line in the direction of circumference of 80 μm, and a cell depth of 20 μm was used and as adhesives, high solid type organic solvent-based adhesives (TM-550, polyester type adhesives, manufactured by Toyo-Morton, Ltd.) were used in a solid matter content of 45% by weight, a laminate was obtained in the same manner as Example B-1. The dry coating amount of the adhesives was 1.2 g/m². Then, appearance of the resulting laminate was visually determined. As a result, scratches were found.

The results obtained from the above are described in Table 4.

As described in Table 4, regarding the appearance of laminates that were obtained after lamination in Example B-1 to Example B-4, the surfaces were uniform and satisfactory. On the other hand, in Comparative example B-1 and Comparative example B-2 in which the screen number of gravure cylinder and/or stylus angle were not within the range of the present invention, the appearance of laminates showed a stripe pattern or scratches, and therefore no satisfactory surfaces were obtained.

Example C-1

By using a ceramic roll having the screen number of 180 lines/inch and a cell volume of 21 cc/m² that was prepared based on a laser engraving process, a biaxially-oriented polypropylene film having a thickness of 20 μm (OPP; PYLEN FILM OT P-2161, manufactured by Toyobo Co., Ltd.) was coated with a high solid type organic solvent-based adhesives (TM-550, polyester type adhesives, manufactured by Toyo-Morton, Ltd.) by a dry laminator (FL2 type, manufactured by FUJI KIKAI KOGYO Co., Ltd.) to have a solid matter content of 45% by weight. The solvent was volatilized using a dryer (at temperatures of 60° C., 70° C., 80° C., 80° C.). After that, a cast polypropylene film having a thickness of 25 μm (CPP; GHC#25, manufactured by TOHCELLO CO., LTD.) was laminated thereto at 50° C. using a nip roll to obtain a laminate.

The laminate obtained above was cut to have a size of 10 cm×10 cm, and the weight of the laminate (A (g)) was measured using a fine balance. After that, the laminate was peeled off, and the adhesives adhered on each peeled surface were completely wiped out using ethyl acetate. The film obtained after wiping the adhesives was dried for 5 minutes at 80° C. Then, the weight of each film obtained after peeling (B(g)) was measured using a fine balance. The dry coating amount was calculated according to the following equation, and it was found to be 3.0 g/m².

Dry coating amount$(g/m^2) = (A-B)/0.01$

Further, appearance of the resulting laminate was visually determined. As a result, it was found that the surface was uniform and satisfactory, and occurrence of a tunneling phenomenon was not observed.

Example C-2

Except that, as a ceramic roll, a cylinder having the screen number of 200 lines/inch and a cell volume of 23 cc/m² that is

TABLE 4

|  | Example | | | | Comparative Example | |
| --- | --- | --- | --- | --- | --- | --- |
|  | B-1 | B-2 | B-3 | B-4 | B-1 | B-2 |
| Adhesive | Organic solvent type | Water-based type | Water-based type | Organic solvent type | Organic solvent type | Organic solvent type |
| Solid matter content(wt %) | 45 | 45 | 45 | 45 | 45 | 45 |
| Manufacturing method of gravure plate | Helio | Helio | Helio | Helio | Helio | Helio |
| Gravure line(line/inch) | 175 | 200 | 250 | 150 | 100 | 350 |
| Stylus angel(°) | 120 | 120 | 130 | 130 | 130 | 130 |
| Plate depth(μm) | 52 | 36 | 22 | 49 | 72 | 20 |
| Shapte | Compressed | Elongate | Elongate | Coarse | Compressed | Compressed |
| Diagonal line in the direction of axis(μm) | 180 | 125 | 98 | 210 | 310 | 85 |
| Diagonal line in the direction of circumference(μm) | 170 | 180 | 145 | 300 | 305 | 80 |
| Dry coating amount(g/m²) | 2.8 | 2.2 | 1.5 | 2.8 | 5.2 | 1.2 |
| Appearance | Good | Good | Good | Good | Stripe pattern | Scratches | prepared according to a laser process was used and as adhesives, water-based acrylic adhesives (ROBOND L-250, manufactured by Rohm and Haas) are used in a solid matter content of 45% by weight, a laminate was obtained in the same manner as Example C-1. The dry coating amount of the adhesives was 3.1 g/m². Then, appearance of the resulting laminate was visually determined. As a result, it was found that the surface was uniform and satisfactory, and occurrence of a tunneling phenomenon was not observed.

Example C-3

Except that, as a ceramic roll, a cylinder having the screen number of 250 lines/inch and a cell volume of 19 cc/m² that is prepared according to a laser process was used and as adhesives, water-based acrylic adhesives (ROBOND L-250, manufactured by Rohm and Haas) were used in a solid matter content of 45% by weight, a laminate was obtained in the same manner as Example C-1. The dry coating amount of the adhesives was 2.5 g/m². Then, appearance of the resulting laminate was visually determined. As a result, it was found that the surface was uniform and satisfactory, and occurrence of a tunneling phenomenon was not observed.

Example C-4

Except that, as a ceramic roll, a cylinder having the screen number of 300 lines/inch and a cell volume of 18 cc/m² that was prepared according to a laser process was used and as adhesives, high solid type organic solvent-based adhesives (TM-550, polyester type adhesives, manufactured by Toyo-Morton, Ltd.) were used in a solid matter content of 45% by weight, a laminate was obtained in the same manner as Example C-1. The dry coating amount of the adhesives was 2.1 g/m². Then, appearance of the resulting laminate was visually determined. As a result, it was found that the surface was uniform and satisfactory, and occurrence of a tunneling phenomenon was not observed.

Comparative Example C-1

Except that, as a ceramic roll, a cylinder having the screen number of 120 lines/inch and a cell volume of 42 cc/m² that was prepared according to a laser process was used and as adhesives, water-based acrylic adhesives (ROBOND L-250, manufactured by Rohm and Haas) were used in a solid matter content of 45% by weight, a laminate was obtained in the same manner as Example C-1. The dry coating amount of the adhesives was 6.0 g/m². Then, appearance of the resulting laminate was visually determined. As a result, occurrence of a tunneling phenomenon was observed.

Comparative Example C-2

Except that, as a ceramic roll, a cylinder having the screen number of 400 lines/inch and a cell volume of 8 cc/m² that was prepared according to a laser process was used and as adhesives, high solid type organic solvent-based adhesives (TM-550, polyester type adhesives, manufactured by Toyo-Morton, Ltd.) are used in a solid matter content of 45% by weight, a laminate was obtained in the same manner as Example C-1. The dry coating amount of the adhesives was 1.2 g/m². Then, appearance of the resulting laminate was visually determined. As a result, scratches were found.

The results obtained from the above are described in Table 5.

In addition, regarding the "cell depth" mentioned in Table 5, it is calculated from the screen number of gravure cylinder and cell volume.

TABLE 5

|  | Example | | | | Comparative Example | |
| --- | --- | --- | --- | --- | --- | --- |
|  | C-1 | C-2 | C-3 | C-4 | C-1 | C-2 |
| Adhesive | Orgnic solvent type | Water-based type | Water-based type | Orgnic solvent type | Water-based type | Orgnic solvent type |
| Solid matter content (mass %) | 45 | 45 | 45 | 45 | 45 | 45 |
| Manufacturing method of seramic roll plate | Laser | Laser | Laser | Laser | Laser | Laser |
| Plate depth | 55 | 55 | 43 | 35 | 85 | 20 |
| Gravure line(line/inch) | 180 | 200 | 250 | 300 | 120 | 400 |
| Cell volume(cc/m²) | 21 | 23 | 19 | 18 | 42 | 8 |
| Dry coating amount(g/m²) | 3.0 | 3.1 | 2.5 | 2.1 | 6.0 | 1.2 |
| Appearance | Good | Good | Gppd | Good | Tunnelig phenomenon | Flow |

What is claimed is:

1. A dry lamination method comprising:
    applying an adhesive having a solid matter content of 35% to 50% by weight diluted in a solvent onto a film according to a gravure process employing at least one material selected from the group consisting of
        a gravure cylinder in which the screen number of gravure cylinder is 135 to 270 lines/inch and cell volume is 10 to 30 cc/m²,
        a gravure cylinder which is engraved by an electronic engraving machine to have a stylus angle of 120 to 140° and the screen number of gravure cylinder lines of 120 to 270 lines/inch, and
        a ceramic roll in which the screen number of gravure cylinder is 135 to 350 lines/inch and cell volume is 10 to 30 cc/m²;
    vaporizing the solvent; and
    laminating the resulting film with another film to obtain a laminate.

2. The dry lamination method according to claim 1, wherein the adhesive is selected from the group consisting of an organic solvent-based adhesive and a water-based adhesive.

3. The dry lamination method according to claim 1, wherein the gravure process employs a gravure cylinder in which the screen number of gravure cylinder is 135 to 270 lines/inch and cell volume is 10 to 30 cc/m².

4. The dry lamination method according to claim 1, wherein the gravure process employs a gravure cylinder which is engraved by an electronic engraving machine to have a stylus angle of 120 to 140° and the screen number of gravure cylinder lines of 120 to 270 lines/inch.

5. The dry lamination method according to claim 1, wherein the gravure process employs a ceramic roll in which the screen number of gravure cylinder is 135 to 350 lines/inch and cell volume is 10 to 30 cc/m$^2$.

6. The dry lamination method according to claim 1, wherein the adhesive is an organic solvent-based adhesive.

7. The dry lamination method according to claim 6, wherein the organic solvent-based adhesive comprises a resin comprising a hydroxyl group and a polyisocyanate compound.

8. The dry lamination method according to claim 7, wherein the resin comprising a hydroxyl group is selected from the group consisting of a polyester resin, a polyether resin, a polyester ether resin, a polyurethane resin, a polyester urethane resin, a polyether urethane resin, a polyester ether resin, and a polyester ether urethane resin.

9. The dry lamination method according to claim 1, wherein the adhesive is a water-based adhesive.

10. The dry lamination method according to claim 9, wherein the water-based adhesive is selected from the group consisting of a water-based polyurethane adhesive, a water-based acrylic adhesive, a water-based polyester adhesive, and a water-based polyether adhesive.

* * * * *